United States Patent
Wolf et al.

(10) Patent No.: US 11,101,887 B2
(45) Date of Patent: Aug. 24, 2021

(54) IDENTIFYING AND SEGMENTING PERFORMANCE ISSUES OVER OPTICAL NETWORKS AND IN-PREMISES INTERFACES WITH INTEGRATED WORKFLOWS

(71) Applicant: VIAVI SOLUTIONS INC., San Jose, CA (US)

(72) Inventors: Hans Joerg Wolf, Woodbine, MD (US); Reynald Dupuis, Germantown, MD (US)

(73) Assignee: VIAVI SOLUTIONS INC., San Jose, CA (US)

( * ) Notice: Subject to any disclaimer, the term of this patent is extended or adjusted under 35 U.S.C. 154(b) by 1 day.

(21) Appl. No.: 16/528,041

(22) Filed: Jul. 31, 2019

(65) Prior Publication Data
US 2021/0036775 A1    Feb. 4, 2021

(51) Int. Cl.
*H04B 10/08* (2006.01)
*H04B 10/079* (2013.01)
*H04Q 11/00* (2006.01)

(52) U.S. Cl.
CPC ... *H04B 10/0793* (2013.01); *H04B 10/07955* (2013.01); *H04Q 11/0067* (2013.01); *H04Q 11/0071* (2013.01); *H04Q 2011/0083* (2013.01); *H04Q 2011/0088* (2013.01)

(58) Field of Classification Search
CPC ...... H04B 10/0793; H04B 10/07955; H04B 3/46; H04B 10/073; H04B 17/101; H04B 2203/5495; H04Q 11/0067; H04Q 11/0071; H04Q 2011/0083; H04Q 2011/0088; H04Q 2011/0079; H04Q 2011/0081; G06F 11/3006; G06F 21/6218; G06F 8/70; H04W 24/08; G01R 31/08; G01R 31/50; G01R 31/52; G01R 31/54; G01R 31/58; H04L 43/50; H04L 41/0631; H04L 41/22; H04L 45/66; H04J 3/14
USPC ................... 398/16, 17, 20, 25, 28
See application file for complete search history.

(56) References Cited

U.S. PATENT DOCUMENTS 9,571,363 B2 * 2/2017 Bugenhagen ....... G06F 11/3006
10,491,296 B1 * 11/2019 Wellbrock ......... H04B 10/0771
2005/0053008 A1 * 3/2005 Griesing ................. H04L 43/50
                                                             370/241

(Continued)

*Primary Examiner* — Hibret A Woldekidan
(74) *Attorney, Agent, or Firm* — Mannava & Kang, P.C.

(57) ABSTRACT

Disclosed are an apparatus and testing methods for performing testing operations over multiple types of links and through multiple potential points of failure to segment sources of problems, which may relate to reported or actual instances of service disruption in a network communication environment. The apparatus may perform service layer testing directly via an optical link, in addition to via Ethernet service layer testing. The apparatus may further conduct tests on other layers as well, including the physical layer, the network layer, and the link layer. To facilitate efficient testing, the apparatus may integrate programmable workflow profiles that specify tests to be conducted, and may interface with a cloud platform for sharing results of the tests, providing end-to-end testing of various components and types of links (whether optical or electrical, including wired and wireless links). Results of the tests may provide guidance to resolve detected problems.

22 Claims, 10 Drawing Sheets

(56) References Cited

U.S. PATENT DOCUMENTS

| | | | |
|---|---|---|---|
| 2008/0279105 A1* | 11/2008 | Absillis | H04L 41/06 370/236.2 |
| 2011/0055632 A1* | 3/2011 | Zimmerman | H04M 3/30 714/31 |
| 2016/0203329 A1* | 7/2016 | Rafaeli | G06F 21/6218 726/28 |
| 2017/0264528 A1* | 9/2017 | Grinkemeyer | H04L 12/2801 |
| 2018/0373619 A1* | 12/2018 | Lyons | G06F 8/70 |
| 2020/0104230 A1* | 4/2020 | Hasija | G06F 9/4881 |

\* cited by examiner

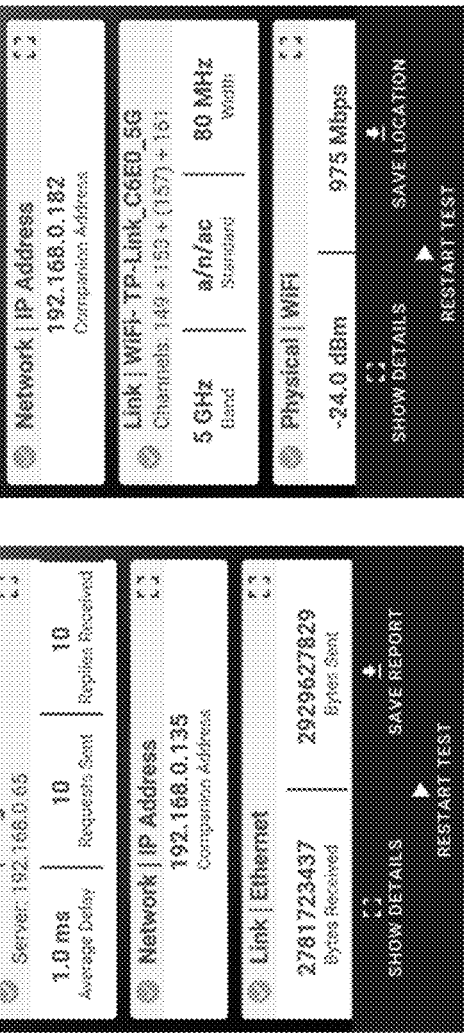
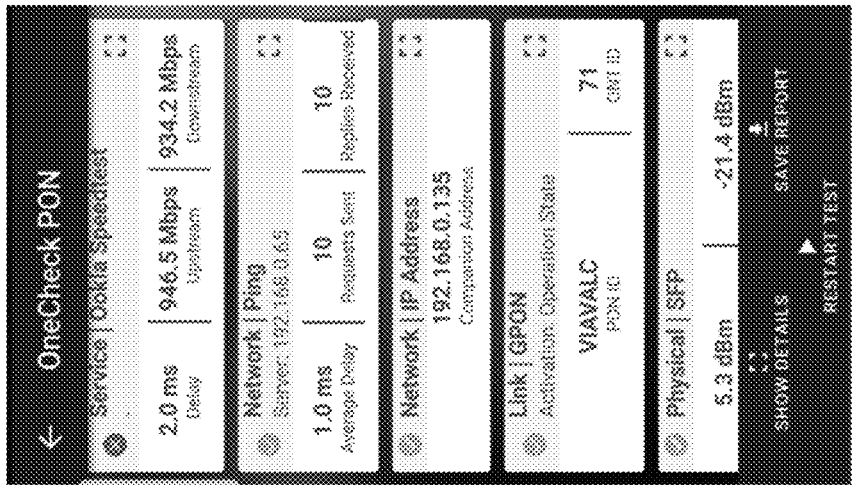
FIG. 6A  FIG. 6B  FIG. 6C

700

Determine that a first input member of an apparatus has been actuated
702

Identify a workflow profile based on the actuation of the first input member
704

Access the workflow profile from a data storage of the apparatus
706

Determine that the speed test is to be executed based on the workflow profile
708 execut the speed test over each of the optical interface, the Ethernet interface, and the WiFi interface to generate respective first, second and third speed test results to segment service performance issues
710

Transmit the first speed test result, the second speed test result, and the third speed test result to a remote device
712

FIG. 7

IDENTIFYING AND SEGMENTING PERFORMANCE ISSUES OVER OPTICAL NETWORKS AND IN-PREMISES INTERFACES WITH INTEGRATED WORKFLOWS

TECHNICAL FIELD

The disclosure relates generally to passive optical network testing, and more particularly to measuring performance of light signals and automating test procedures through automated workflows in a testing device.

BACKGROUND

A Passive Optical Network (PON) may deliver data communication services via light signals transmitted through optical links such as fiber optic cabling. The PON may provide light signals through a drop terminal, which may then provide the light signals inside a customer premises (such as a residential building) to an Optical Termination Panel (OTP). The OTP may provide the light signals to an Optical Network Terminal (ONT), which converts the light signals to electrical signals and provides the electrical signals to a router. The router may propagate data transmission inside the customer premises through the electrical signals, such as through an Ethernet protocol. Outgoing data from the customer premises back through the PON may flow in the opposite direction, in which case the ONT may convert electrical signals into optical signals for propagation through the PON. Because of the various points of failure along this path, some of which may result from end user (typically an occupant of the customer premises) misconfiguration of the customer premises network, it may be difficult to troubleshoot problems occurring with data transmission to and from the customer premises.

For example, a technical problem arising from optical networks is that testing equipment used at the drop terminal or the OTP may measure only the optical levels coming to the customer premises from the PON. Such testing may not indicate problems within the customer premises other than the OTP. Furthermore, such testing does not provide a real-world test of data transmission rates over the fiber optic cable. In other words, optical level measurements do not provide a measure of data transmission rates via the optical signals transmitted through the fiber optic cable. As such, the root cause of any problems (usually noticed by an end user at the customer premises as insufficient bandwidth or network speed at end user devices) may be difficult and time consuming to diagnose and correct. Furthermore, end users may be unsatisfied at being informed that the incoming optical signal measured at the OTP or the drop terminal is sufficient even though the end users may continue to experience problems (which may be caused by factors other than the optical signal measured at the OTP or the drop terminal). In addition to the foregoing problems, the technician may be unaware of prescribed test operations that should be undertaken to troubleshoot and resolve problems. Thus, what is needed is a device that is able to perform end-to-end segmentation testing to isolate problems with data and other services provided via an optical network, What is further needed is to automate testing procedures to efficiently segment, diagnose, and resolve problems occurring in an optical network.

BRIEF DESCRIPTION OF THE DRAWINGS

Features of the present disclosure may be illustrated by way of example and not limited in the following figure(s), in which like numerals indicate like elements, in which:

FIG. 6A illustrates a screenshot view of a graphical user interface that displays optical signal test results, according to an example of the disclosure;

FIG. 6B illustrates a screenshot view of a graphical user interface that displays electrical signal test results, according to an example of the disclosure;

FIG. 6C illustrates a screenshot view of a graphical user interface that displays wireless signal test results, according to an example of the disclosure;

FIG. 7 illustrates a method of segmenting service performance issues based on tests specified in workflow profiles, according to an example;

DETAILED DESCRIPTION

Figure 1:
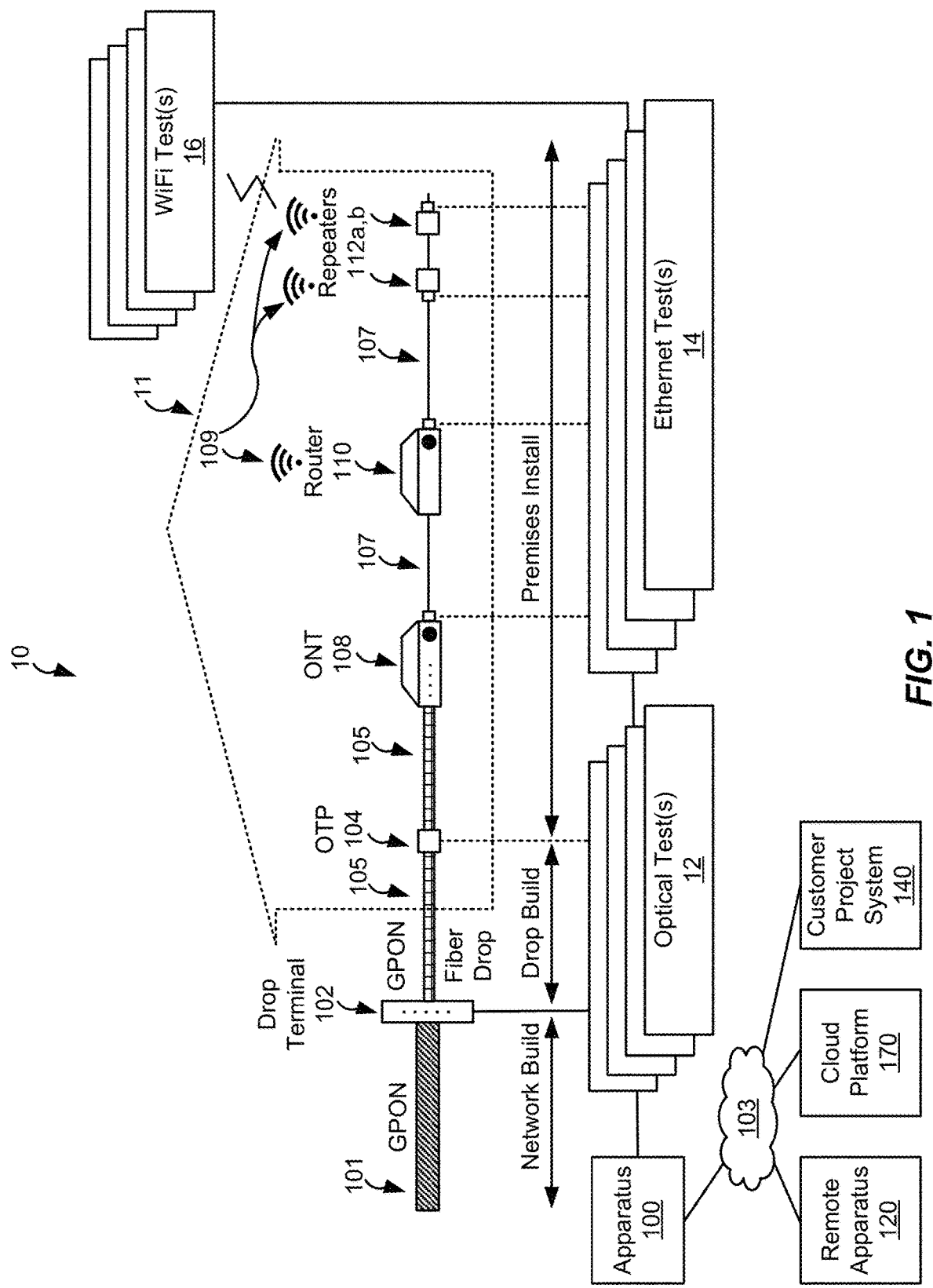
FIG. 1 is a schematic diagram of a network and service environment in which an apparatus may test network services, according to an example of the disclosure.

In the following description, numerous specific details are set forth in order to provide a thorough understanding of the present disclosure. It will be readily apparent however, that the present disclosure may be practiced without limitation to these specific details. In other instances, some methods and structures readily understood by one of ordinary skill in the art have not been described in detail so as not to unnecessarily obscure the description of the present disclosure. Also, for simplicity and illustrative purposes, the present disclosure is described below by referring mainly to examples. As used herein, the terms "a" and "an" are intended to denote at least one of a particular element, the term "includes" means includes but not limited to, the term "including" means including but not limited to, and the term "based on" means based at least in part on.

The present disclosure provides examples of an apparatus and testing methods for performing testing operations over multiple types of links and through multiple potential points of failure to segment sources of problems, which may relate to reported or actual instances of service disruption. The apparatus may integrate programmable workflow profiles that specify tests to be conducted, and may interface with a cloud platform for sharing results of the tests, providing end-to-end testing of various components and types of links (whether optical or electrical, including wired and wireless links).

To provide data communication services to a premises, a PON may transmit light signals through optical links such as fiber optic cabling. One version of a PON is a Gigabit PON (GPON). For purposes of discussion, the terms GPON and PON will be used interchangeably throughout. The PON may provide the light signals through a drop terminal, which may then provide the light signals inside the customer premises to an OTP. The OTP may provide the light signals to an ONT, which converts the light signals to electrical signals and provides the electrical signals to a router. The router may propagate data transmission inside the customer premises through the electrical signals, such as through an Ethernet protocol. The router may provide wireless signals throughout various areas of the customer premises. The wireless signals may be repeated by one or more repeaters in the customer premises, which serve to receive signals from the router, and re-transmit them to enhance coverage of the wireless signals.

A technical problem arising from optical networks is that testing equipment used ata drop terminal or the OTP may measure only the optical levels coming to the customer premises from the PON. Such testing may not indicate problems within the customer premises other than the OTP, making segmentation of problems difficult. Furthermore, such testing does not provide a real-world test of data transmission rates over the fiber optic cable. In other words, optical level measurements do not provide a measure of data transmission rates via the optical signals transmitted through the fiber optic cable. As such, the root cause of any problems (usually noticed by an end user at the customer premises as insufficient bandwidth or network speed at end user devices) may be difficult and time consuming to diagnose and correct. Furthermore, end users may be unsatisfied at being informed that the incoming optical signal measured at the OTP or the drop terminal is sufficient. In addition to the foregoing problems, the technician may be unaware of prescribed test operations that should be undertaken to troubleshoot and resolve problems.

The apparatus may conduct service layer network testing directly from an optical link such as via a fiber optic cable. Accordingly, the apparatus may be connected to a drop terminal or OTP to measure service-level performance (such as through data transmission rate measurements) directly via the optical link. The apparatus may conduct such optical testing over various optical network rates such as 1G, 2.5G, 10G, 40G, 100G, and/or other rates. The apparatus may also conduct such optical testing on various types of optical technologies such as GPON, Ethernet passive optical network (EPON), electrical Ethernet, and so forth. As such, the apparatus may encode and decode GPOn<EPON, electrical Ethernet, and/or other protocols. This may be in addition to such testing via electrical signals such as Ethernet (whether wired or wireless) to enable segmentation of service layer performance. The apparatus may conduct different types of testing over different layers such as a network layer, link layer, and physical layer to segment a type of problem as well.

The particular testing operations performed by the apparatus may be selected by a field technician operating the testing apparatus. In some examples, to facilitate efficient testing, the apparatus may integrate one-touch automated workflow profiles that each specify one or more testing operations to be conducted. Such testing operations may be directed at the service layer, the network layer, the link layer, and/or the physical layer.

The programmable workflow profiles may be tailored to specify testing operations for a particular project or may include templated workflow profiles that may be used to specify testing operations for a general set of projects. In some examples, the programmable workflow profiles may include a one-touch operation in which a button or other input member may be pre-programmed to execute a workflow profile specifically assigned to that button. In some examples, the apparatus may provide results of the testing to a separate testing apparatus and/or a cloud platform, which may share the results with other devices. In some examples, the apparatus may provide results of the testing via on-board visual indicators (such as light emitting diode indicators). Having described a high-level overview of the apparatus, attention will now turn to an example of a network and service environment in which the apparatus may operate.

FIG. 1 is a schematic diagram of a network and service environment 10 in which an apparatus 100 may test network services, according to an example of the disclosure. The network services may include data and/or voice services such as Internet and/or phone service. The network and service environment 10 may include various communication layers (such as physical layers and network layers) and types of communication links over which various devices of the network and service environment 10 facilitate provision of the network services to an end user premises 11 (referred to hereinafter as premises 11). For example, the network and service environment 10 may include various types of links such as a feeder fiber optic cable 101, a fiber optic cable 105, an electrical (such as Ethernet) cable 107, and wireless links 109 (such as a WiFi signal). The network and service environment 10 may include various types of devices, which may be connected to one another via the links. The devices may facilitate provision of the network services to the customer premises 11. Such devices may include a drop terminal 102, an Optical Termination Panel (OTP) 104, an Optical Network Terminal (ONT) 108, a router 110, and one or more repeaters 112. The apparatus 100 may execute testing operations through various ones of the links and devices of the network and service environment 10, enabling localization of any problems within the network and service environment.

The feeder fiber optic cable 101 may include a physical optical connection between the drop terminal 102 and the rest of a network provided by a service provider such as an Internet Service Provider (ISP). The network may include a Passive Optical Network (PON). In particular, the PON may include a Gigabit PON (GPON). The PON, and more particularly, the GPON may transmit and receive data in the form of optical signals. The drop terminal 102 is a device that accepts the feeder fiber optic cable 101 and connects fiber optic (the term "fiber optic" may also be referred to interchangeably herein as simply "fiber") cable 105 to the customer premises 11 via the OTP 104. The drop terminal 102 may be located outside (but on or nearby) the customer premises 11 such that it is accessible without entering the customer premises 11. The OTP 104 may be located inside the customer premises and may be connected to the ONT 108 via fiber optic cable 105.

The ONT 108 may be connected to the router 110 through electrical cable 107. The ONT 108 may convert optical signals (transmitted via fiber optic cable 105) to/from the OTP 104 to electrical signals (transmitted via electrical cable 107) to/from the router 110. The router 110 may transmit and receive data transmissions via a wired or wireless connection to end user devices (not illustrated) to connect such devices to a Wide Area Network, such as the Internet through the GPON. In some examples, the router 110 may be connected to one or more repeaters 112 (illustrated as repeaters 112a,b) through electrical cable 107. It should be noted that links (such as various types of cables described herein) with like numerals shown in FIG. 1 illustrate types of cabling and not necessarily a single physical length of cable. For example, the fiber optic cable 105 between the drop terminal 102 and the ONT 108 is not necessarily (and usually is not) a single length of fiber optic cable 105.

When an end user experiences a problem with the network services at the customer premises 11, the ISP may send a technician to troubleshoot the problem. For example, a project in the customer project system 140 may be created to address the problem. In some instances, the project may include a new install and verification of services for the new install at the customer premises 11.

A technical problem arising from optical networks is that testing equipment used at the drop terminal 102 or the OTP 104 may measure only the optical levels coming to the customer premises 11 from the GPON. Such testing may not indicate problems within the customer premises 11 other than the OTP 104. Furthermore, such testing does not provide a real-world test of data transmission rates over the fiber optic cable 105. In other words, optical level measurements do not provide a measure of data transmission rates via the optical signals transmitted through the fiber optic cable 105. As such, the root cause of any problems (usually noticed by an end user at the customer premises 11 as insufficient bandwidth or network speed at end user devices) may be difficult and time consuming to diagnose and correct. Furthermore, end users may be unsatisfied at being informed that the incoming optical signal measured at the OTP 104 or the drop terminal 102 is sufficient. In addition to the foregoing problems, the technician may be unaware of prescribed test operations that should be undertaken to troubleshoot and resolve problems.

Various examples of an apparatus 100 disclosed herein may include technology improvements that address the foregoing and other problems. For instance, the apparatus 100 may perform tests across different types of links at various points in the network and service environment 10, enabling localization of any problems. For example, the apparatus 100 may include a power supply that makes it portable to various locations inside and outside of the customer premises 11 to test at various locations (including throughout the customer premises 11 for WiFi tests 16). In particular, the apparatus 100 may connect to the drop terminal 102 or OTP 104 via fiber optic cable 105 to execute optical tests 12. The apparatus 100 may be connect to an electrical port of the ONT 108, the router 110 or the repeaters 112 via electrical cable 107 to execute Ethernet tests 14. The apparatus 100 may wirelessly connect to the router 110 or the repeaters 112 via wireless link 109 to execute WiFi tests 16. By testing various points and links in the network and service environment 10, the apparatus 100 may be able to localize any problems.

Each of the optical tests 12, Ethernet tests 14, and Wireless Fidelity (WiFi) tests 16 may include a test of the physical layer, the link layer, the network layer, and the service layer, so that multiple layers of each type of connection may be characterized. The physical, link, network, and service layer tests may be specific to each of the optical tests 12, the Ethernet tests 14, and the WiFi tests 16. For example, a physical layer test included in the optical tests 12 may measure optical power levels transmitted over the fiber optic cable 105. A physical layer test included in the Ethernet tests 14 may measure a level of Ethernet traffic flowing through the electrical cable 107 (such as an Ethernet cable). A physical layer test included in the WiFi tests 16 may measure a signal strength of the wireless link 109 from the router 110 or a repeater 112. Other layer tests may likewise be specific to the optical tests 12, Ethernet test 14, and WiFi tests 16 (although some layer tests may be the same throughout the optical tests 12, Ethernet tests 14, and WiFi tests 16).

Table 1 below illustrates various layers (such as physical, link, network, and service) that are tested for the different types of tests 12, 14, and 16. It should be noted that the profile parameters may specify any one of these tests, related data to configure or otherwise run the tests (including any WiFi or other credentials), and/or data to measure results of the tests (such as threshold values described in this disclosure). It should also be noted that appropriate configurations (such as correct OLT identifications) for the premises 11 may be included in a workflow or other information accessed at the apparatus 100 so that the apparatus 100 may validate such configurations during one or more tests. One example of such a configuration may include a configuration of an ONT 108 and OLT. In some examples, a given ONT may be provisioned specifically for a certain traffic type (e.g. Data, VOIP and Video). In these examples, different ONTs may have different configurations. The apparatus 100 may verify that an OLT serving the ONT is correctly configured for the given ONT based on the configuration of the ONT (or vice versa verify that the OLT is configured as expected, but that any error may be a result of a misconfiguration of the ONT).

TABLE 1

Various data, measurements, or other conditions used to obtain results of the tests are listed in brackets ("[ ]"). For example, broadband performance may be gauged based on a speed test measurement obtained while conducting a speed test.

|  | PON | Ethernet | WiFi |
| --- | --- | --- | --- |
| Service | Broadband Performance Profile correct? [Speed test measurement] | Broadband Performance Profile correct? [Speed test measurement] | Broadband Performance Profile correct? [Speed test measurement] |
| Network | Getting an IP address? Authentication access? [PPPoE, DHCP] | Getting an IP address? Authentication access? [PPPoE, DHCP] | Getting an IP address? Authentication access? [PPPoE, DHCP] |

TABLE 1-continued

Various data, measurements, or other conditions used to obtain results of the tests are listed in brackets ("[ ]"). For example, broadband performance may be gauged based on a speed test measurement obtained while conducting a speed test.

| | PON | Ethernet | WiFi |
|---|---|---|---|
| Link | Connected to the correct PON branch? Connected to the correct OLT? [OLT ID, PON ID] | Ethernet Traffic? [Ethernet traffic LEDs] | Connected to the correct WiFi network? Correct WiFi settings? [BSSID, Security, Band] |
| Physical | Enough Light [Optical power levels] | Ethernet Signal? [Ethernet Traffic LEDs] | Enough WiFi Coverage in each room? [Wifi Signal Strength] |

In some examples, some or all of the optical tests 12, Ethernet tests 14, and/or WiFi tests 16 may be encoded in and automatically executed based on programmable workflows stored at the apparatus 100. In this manner, the apparatus 100 may be pre-programmed with programmable workflows to automate some or all testing. As will be described later, such automated workflow-based testing may be initiated based on actuation of an input member (also referred to as an "input" interchangeably throughout) of the apparatus 100. In some examples, a single button press on the apparatus 100 may initiate the automated workflow-based testing. Thus, one-touch workflow initiation for executing one or more tests may be achieved. In some examples, different workflows may be prestored at the apparatus 100 and a specific workflow profile to be executed may be initiated based on profile actuation of the input member. For example, the apparatus 100 may scroll through the plurality of workflow profiles as an input member is actuated. During the scrolling, the apparatus 100 may receive a selection of a workflow profile to be executed among a plurality of pre-stored workflow profiles and automatically execute the selected workflow profile (i.e., automatically execute the tests specified by the workflow profile). It should be noted that the term "press" as used herein is provided as an illustrative example. Other types of actuations of other types of input members may be used as well.

In some examples, the apparatus 100 may be communicably coupled to a remote apparatus 120 and a cloud platform 130. The remote apparatus 120 may be a dedicated testing device or a multi-function device such as a mobile phone, tablet, laptop, etc. The cloud platform 130 may include networked devices that communicate with the remote apparatus 120 and/or the apparatus 100 to provide networked functionality, such as storing, retrieving, and providing test results and storing, retrieving, and providing workflows. In some examples, the apparatus 100, though independently operable of the remote apparatus 120, may be configured as a companion device to the remote apparatus 120. In this sense, the apparatus 100 may itself be considered a testing instrument. In some examples, the apparatus 100 may upload test results to the remote apparatus 120 and/or the cloud platform 130. In some examples, the apparatus 100 may download workflows from the remote apparatus 120 and/or the cloud platform 130.

Figure 2A:
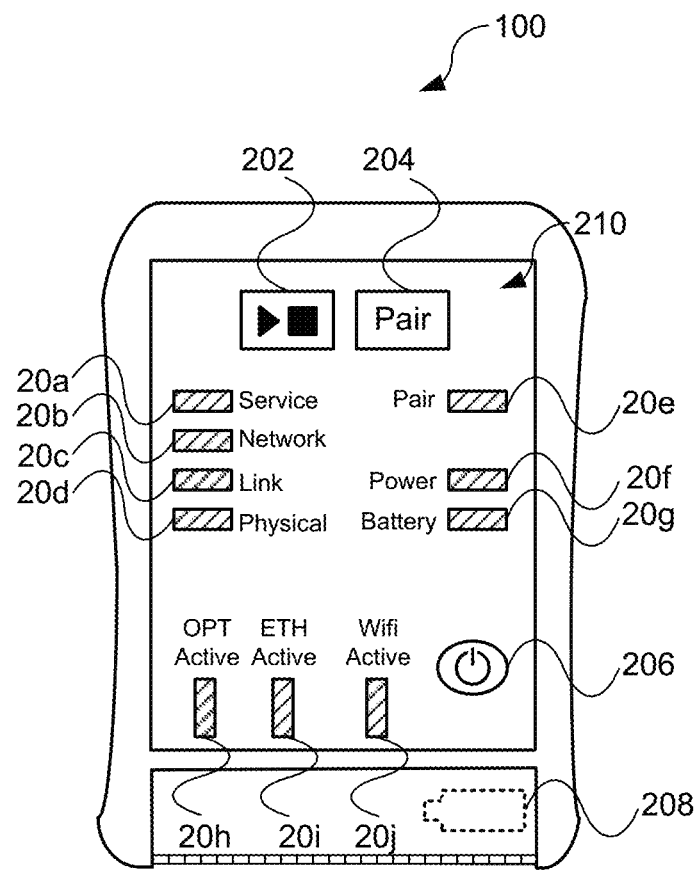
FIG. 2A illustrates a top-down view of an apparatus for testing network services in the network and service environment, according to an example of the disclosure.
Figure 2B:
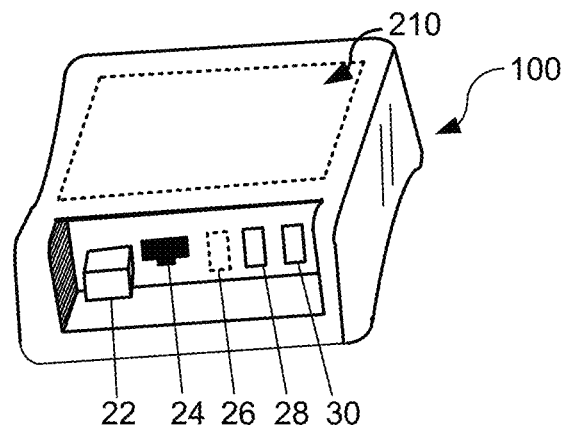
FIG. 2B illustrates a perspective view of apparatus for testing network services in the network and service environment, according to an example of the disclosure.
Figure 3:
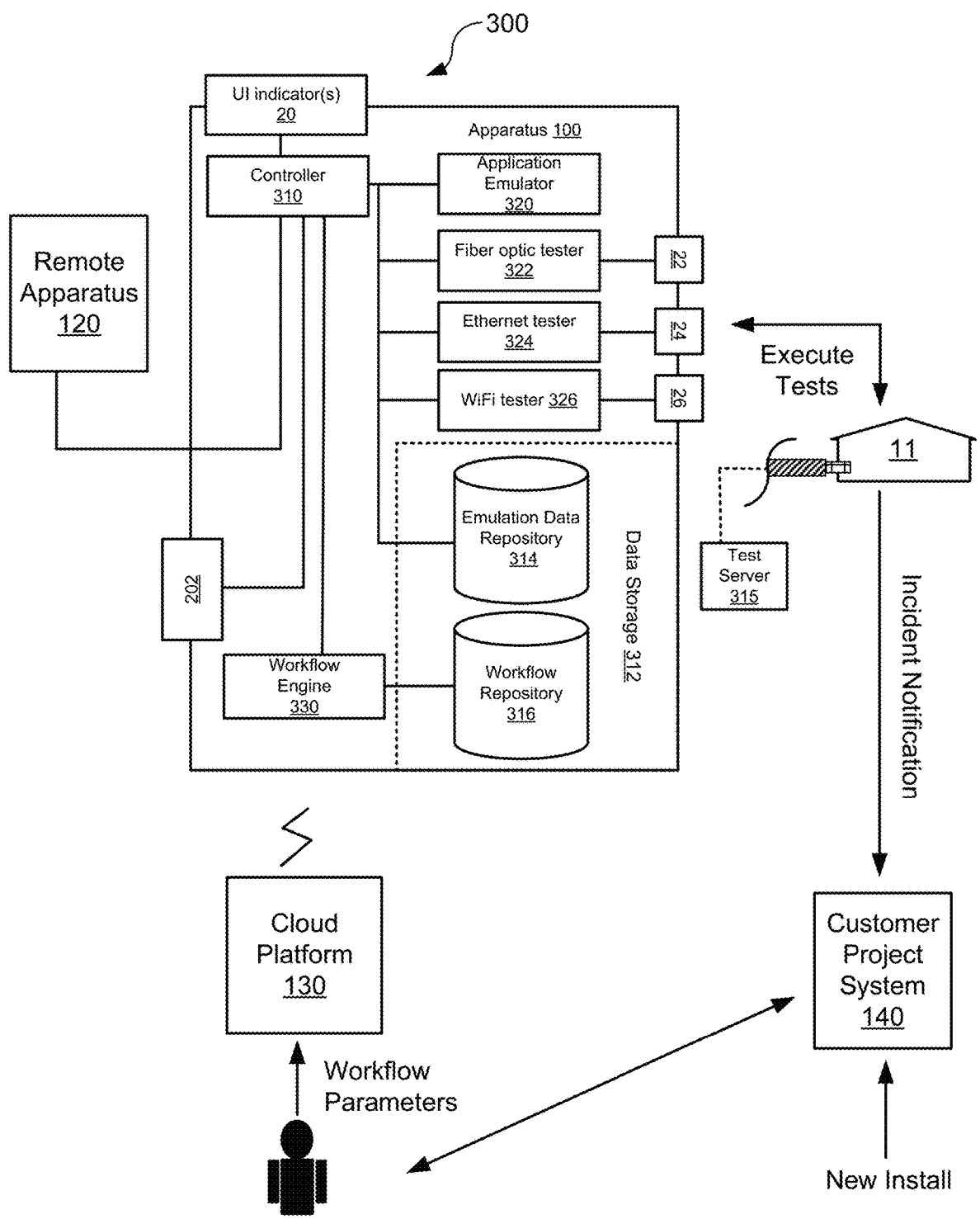
FIG. 3 illustrates a block diagram of an apparatus for testing network services in the network and service environment, according to an example of the disclosure.

Having described an overview of the network and service environment 10, attention will now turn to a description of the apparatus 100 with reference to FIGS. 2a, 2b, and 3. FIG. 2A illustrates a top-down view of an apparatus 100 for testing network services in the network and service environment 10. FIG. 2B illustrates a perspective view of apparatus 100 for testing network services in the network and service environment 10. It should be noted that the appearance of the apparatus 100 and arrangement and number of features of the apparatus 100 are shown for illustrative purposes only. Other appearances and number/arrangement of the features may be used as well.

The apparatus 100 may include various input members such as input members 202, 204, and 206. Each of the input members 202, 204, 206 may include a hardware input member such as a button or other type of mechanical input. In other examples, each of the input members 202, 204, 206 may include a software input member, such as one displayed on a touch screen for examples in which the apparatus 100 includes a touch screen input device (not illustrated). Input member 202 may include a "Play" button that, when pressed, may initiate a test operation (such as from a test 12, 14, and/or 16). Input member 204 may include a "Pair" button that, when pressed, may initiate pairing with another device, such as remote apparatus 120. Such pairing may be accomplished via a device-to-device protocol such as the Bluetooth™ protocol. Input member 206 may include a power button that, when pressed, may power on or off the apparatus 100. It should be noted that although buttons are illustrated, other types of input members such as switches and other mechanical inputs, may be used. Furthermore, although mechanical input members may be used to reduce complexity and cost of the apparatus 100, software-based input members including those based on touch/capacitive screens may be used.

In some examples, the apparatus 100 may include a power supply 208 such as a battery, which may be removable. Accordingly, the apparatus 100 in these examples may generally be portable to perform test operations throughout and outside the customer premises 11.

The apparatus 100 may include various user interface (UI) indicators 20 (illustrated as UI illustrated as UI indicators 20a-f). Each UI indicator 20 may include a Light Emitting Diode (LED) or other type of visual indicator to provide an indication of a state of the apparatus 100. For example, the UI indicator 20a may indicate a service layer test state. The UI indicator 20b may indicate a network layer test state. The UI indicator 20c may indicate a link layer test state. The UI indicator 20d may indicate a physical layer test state. The UI indicator 20e may indicate paired connection state. The UI indicator 20f may indicate power on/off/sleep state. The UI indicator 20g may indicate a battery level state. The UI indicator 20h may indicate OPT active (fiber optic interface) state. The UI indicator 20i may indicate an Ethernet active (Ethernet interface) state. The UI indicator 20j may indicate a WiFi active (WiFi interface) state. Each of the UI indicators 20 may be displayed differently to convey different information or states. Such differential display may include different colors, flashing, etc. Thus, as used herein, any one of the UI indicators 20 may be activated to indicate a particular state (such as test result, test progress, and other state) or other information to be conveyed to a user of the apparatus 100. In some instances, the apparatus 100 may activate combinations UI indicators 20 to indicate a state. For example, three UI indicators 20 may be activated to remain on to indicate a first state. In another example, three UI indicators 20 may be activated to blink to indicate a second (different) state. The apparatus 100 may activate other numbers of UI indicators 20 to indicate various states as well.

The apparatus 100 may include various communication interfaces to connect to different types of links. For instance, the apparatus 100 may include a fiber optic interface 22 (such as a Small Form-factor Pluggable (SFP) transceiver) to connect to the fiber optic cable 105, an Ethernet interface 24 (such as an Ethernet port) to connect to the electrical cable 107, a WiFi interface 26 (such as a Wireless Fidelity (WiFi) interface) to connect to a wireless signal from the router 110 and/or repeaters 112, and a wired device interface 28 (such as a Universal Serial Bus (USB) port) to connect with other devices such as testing apparatus 120. In some examples, the apparatus 100 may include a charging port 30 for charging the power supply 208. The charging port may include a USB port. It should be noted that the perspective view of FIG. 2B omits details of portion 210 for illustrative clarity; the details of portion 210 are illustrated in FIG. 2A.

Referring now to FIG. 3, the apparatus 100 may be a generally portable computing device such as a handheld test instrument having circuitry and data storage for conducting the tests described herein. For example, the apparatus 100 may include a controller 310, a data storage 312, an application emulator 320, a fiber optic tester 322, an Ethernet tester 324, a WiFi tester 326, a workflow engine 330, and/or other features (including one or more of the features described with respect to FIGS. 2A and 2B). Each of the controller 310, application emulator 320, fiber optic tester 322, Ethernet tester 324, WiFi tester 326, and workflow engine 330 may include a hardware processor or other known types of control circuitry, including field programmable gate arrays, etc., for performing the operations and functions described herein. Each of the controller 310, the application emulator 320, the fiber optic tester 322, the Ethernet tester 324, the WiFi tester 326, and the workflow engine 330 may include a processor that may control operations of the apparatus 100. The processor may be a semiconductor-based microprocessor, a central processing unit (CPU), an application specific integrated circuit (ASIC), a field-programmable gate array (FPGA), and/or other suitable hardware device.

It should be noted that each of the foregoing may be integrated with one another. For example, the controller 310 may be integrated with the application emulator 320, fiber optic tester 322, Ethernet tester 324, WiFi tester 326, and/or the workflow engine 330. The data storage 312 may include memory or any suitable computer readable storage medium for storing data and/or machine-readable instructions used by the apparatus 100. For example, the data storage 312 may store an emulation data repository 314 and a workflow repository 316. The data storage 312 may be an electrical, magnetic, optical, or other physical storage device that includes or stores executable instructions. The data storage 312 may be, for example, Random Access memory (RAM), an Electrically Erasable Programmable Read-Only Memory (EEPROM), a storage device, an optical disc, and the like. The data storage 312 may be a non-transitory machine-readable storage medium, where the term "non-transitory" does not encompass transitory propagating signals.

The emulation data repository 314 may store test data for emulating services (such as video, voice, and other data services) that may be used by devices on the customer premises 11. The workflow repository 316 may store workflow profiles that each specify one or more testing operations 12 to be performed outside or inside premises 11.

Fiber Optic Testing (PON/GPON)

The fiber optic tester 322 may perform one or more optical tests 12 using the fiber optic interface 22 to test data communication (receive and/or transmit) via fiber optic cable 105. The optical tests 12 may include a physical layer test, a link layer test, a network layer test, and a service layer test. The optical tests 12 may be based on signals transmitted and/or received by the fiber optic tester 322.

Figure 4A:
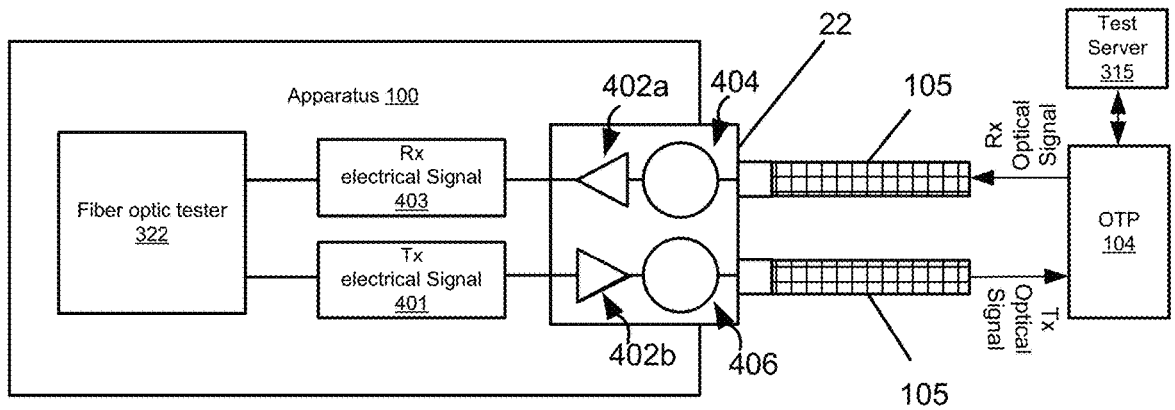
FIG. 4A illustrates a block diagram of an apparatus for testing network services over a physical optical layer, according to an example of the disclosure.

For instance, referring to FIG. 4A, the fiber optic tester 322 may transmit electrical signals (Tx electrical signal 401) and receive electrical signals (Rx electrical signal 403) via the fiber optic interface 22. The fiber optic interface 22 may include an electrical interface 402b to receive the Tx electrical signal 401 from the fiber optic tester 322 and provide the Tx electrical signal 401 to an optical emitter 406. The optical emitter 406 may include an LED, laser, or other emitter than may convert the Tx electrical signal 401 to an optical signal (Tx optical signal) based on an incoming voltage or pulse, or other property of the electrical signal. The optical emitter 406 may transmit the optical signal over the fiber optic cable 105. As illustrated, the fiber optic cable 105 may be connected to the OTP 104, which transmits the optical signal to the drop terminal 102, which in turn transmits the optical signal to the rest of the GPON. In other words, in the example illustrated, the apparatus 100 may be connected to the OTP 104 via the fiber optic cable 105. It should be noted that the apparatus 100 may be connected to the drop terminal 102 via the fiber optic cable 105 as well, enabling optical tests 12 to be performed at either of these optical points in the network and services environment 10.

The fiber optic interface 22 may include an optical detector 404 that receives an optical signal (Rx optical signal) via the fiber optic cable 105. The optical detector 404 may include a semiconductor detector such as a photodiode or photodetector, a silicon photodiode, a Germanium detector, an Indium Gallium Arsenide (InGaAs) detector, avalanche photodiodes (APDs), and/or other type of detector that can convert the optical signal into an electrical signal. The optical detector 404 may convert the optical signal into an electrical signal (Rx electrical signal 403), which may be conveyed by the fiber optic interface 402a to the fiber optic tester 322. It should be noted that the fiber optic interface 22 may operate on a single bi-directional fiber optic cable as well.

The fiber optic tester 322 may test the physical layer of data communication through the fiber optic cable 105 by obtaining the power levels of the Rx optical signal received at the detector 404. In this manner, the apparatus 100 may determine and report the power level of an optical signal from the OTP 104 and/or the drop terminal 102 (depending on which of the OTP 104 or drop terminal 102 to which the apparatus 100 is connected).

The fiber optic tester 322 may test the link layer of data communication through the fiber optic cable 105 by verifying proper GPON configuration. For example, the fiber optic tester 322 may obtain an Optical Line Termination (OLT) identification (such as via a PON identification that identifies a port of the OLT to which the ONT is connected) and/or an ONT identification, which may be assigned by the OLT to identify the ONT), and/or other identification of a component of the GPON to which the apparatus 100 is connected (through the OTP 104, for example). The fiber optic tester 322 may verify whether the OTP 104 is connecting to the correct OLT and/or PON, and/or whether the OLT and ONT are correctly configured, such as based on predefined data relating to such configurations and identifications such as those listed in Table 1.

The fiber optic tester 322 may test the network layer of data communication through the fiber optic cable 105 by verifying that the apparatus 100 is able to obtain an IP address and authenticated access to the Internet via the fiber optic cable 105 (from the ONT 108).

The fiber optic tester 322 may test the service layer of data communication through the fiber optic cable 105 by transmitting and receiving data through the fiber optic interface 22. For instance, the fiber optic tester 322 may provide a Tx electrical signal 401 to the optical emitter 406 via the interface 402b to test upload speeds. The term upload or download speed as used herein refers to a rate at which a size of data is transferred over a network per unit time. Such speed may also be referred to as a data transfer (transmission or receipt) rate and may be expressed as, without limitation, Megabits per second (Mbps) or Gigabits per second (Gbps). The Tx electrical signal 401 may include a known size to monitor transmission rates. The Optical emitter 406 may convert the Tx electrical signal 401 to a Tx optical signal that is transmitted through the fiber optic cable 105 to, for example, the OTP 104. The OTP 104 transmits the data through the PON (or GPON) ultimately to the test server 315, which may include a speed test server that sends and receives defined sizes of data to monitor transmission rates. The test server 315 may return an acknowledgement, a time of receipt of the Tx optical signal, and/or an upload rate, which may be based on a time transmitted with the Tx optical signal. Based on the transmission from the test server 315, the fiber optic tester 322 may determine an upload speed via the Tx optical signal, such as via a connection to the OTP 104 through fiber optic cable 105. For example, the fiber optic tester 322 may calculate the upload speed based on the predefined size of the Tx electrical signal 401 and the elapsed time for the test server 315 to receive the data via the Tx optical signal or simply obtain the upload rate from the test server 315, depending on the implementation. In these examples, it should be noted that the test server 315 may include a speed test server, including third party speed test servers.

To test download speeds via the fiber optic cable 105 from the OTP 104, the test server 315 (or component of the system coupled to the test server 315) may provide an Rx optical signal across the PON with data having a known size. The fiber optic interface 22 may receive the Rx optical signal via the detector 404, which may convert the Rx optical signal into an Rx electrical signal 403 and provide the Rx electrical signal 403 to the fiber optic tester 322 via the interface 402a. The fiber optic tester 322 may determine a time of receipt and a time of transmission of the Rx electrical signal 403, and the size of data in the Rx electrical signal (in other words, the size of the data transmitted from the test server 315), to calculate a download speed achieved through the fiber optic cable 105, such as via the OTP 104. In this manner, the apparatus 100 may test service level performance (such as data communication rates) via an optical signal transmitted over a fiber optic cable 105. For example, the apparatus 100 may be connected to the OTP 104 via the fiber optic cable 105 to test speed performance through optical signals. Conventional testers may perform such testing at a router using electrical signals.

Ethernet Testing (Premises Network)

Figure 4B:
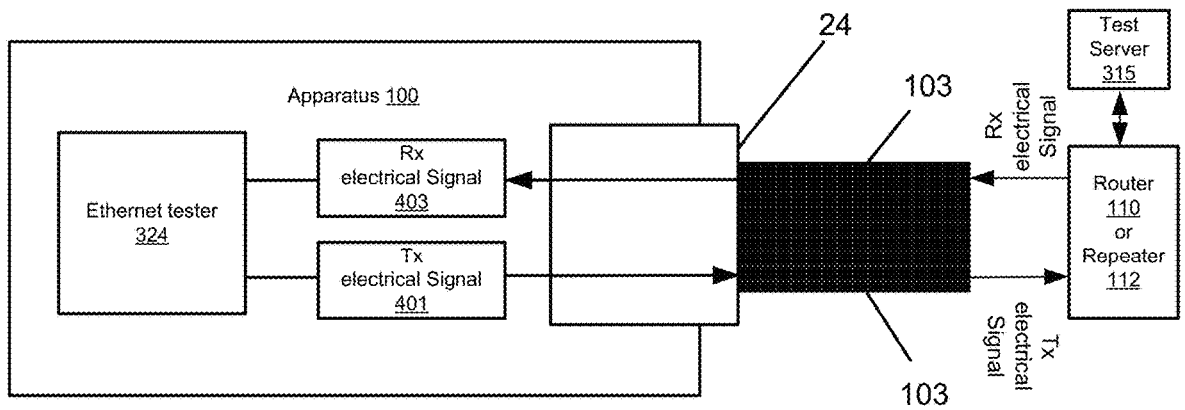
FIG. 4B illustrates a block diagram of an apparatus for testing network services over a physical Ethernet layer, according to an example of the disclosure.
Figure 4C:
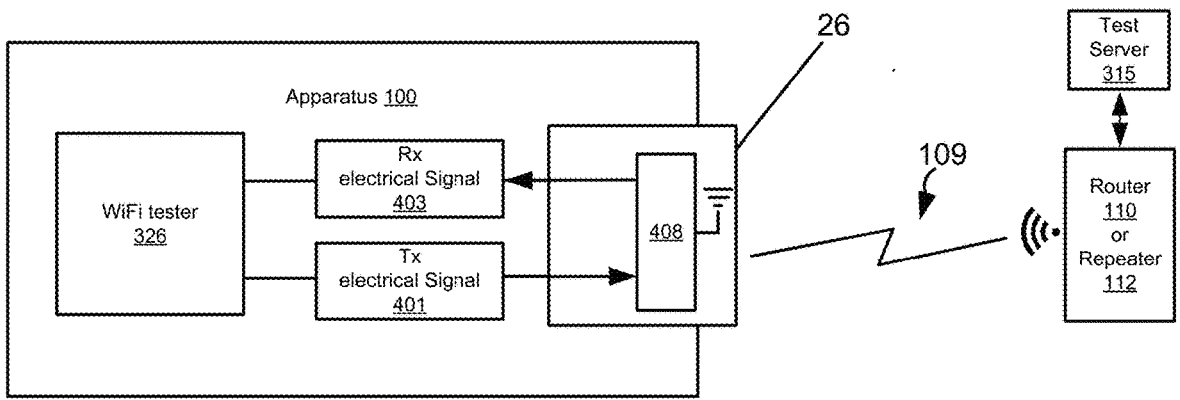
FIG. 4C illustrates a block diagram of an apparatus for testing network services over a physical WiFi layer, according to an example of the disclosure.

Referring to FIG. 4B, the Ethernet tester 324 may perform one or more Ethernet tests 14 using the Ethernet interface 24 to test data communication (receive and/or transmit) via electrical cable 107. The Ethernet tests 14 may include a physical layer test, a link layer test, a network layer test, and a service layer test. The Ethernet tests 14 may be based on signals transmitted and/or received by the Ethernet tester 324.

The Ethernet tester 324 may perform one or more test operations 12 using the Ethernet interface 24 to electrical data transmissions via electrical cable 107.

The Ethernet tester 324 may test the physical layer of data communication through the electrical cable 107 by transmitting and/or receiving data through the Ethernet interface 24 and determining whether electrical (such as Ethernet) signals are being transmitted and/or received through the Ethernet interface 24. The presence of such signals may also be indicated through LED indicators (not illustrated) of the Ethernet interface 24.

The Ethernet tester 324 may test the link layer of data communication through the electrical cable 107 based on observed Ethernet traffic across the Ethernet interface 24, similar to the manner in which the physical layer is tested for the physical layer of Ethernet links.

The Ethernet tester 324 may test the network layer of data communication through the electrical cable 107 by verifying that the apparatus 100 is able to obtain an IP address and authenticated access to the Internet via the electrical cable 107 (from the router 110).

The Ethernet tester 324 may test the service layer of data communication through the electrical cable 107 by transmitting or receiving electrical signals similar to the manner in which the fiber optic tester 322 tests the service layer, except that the Ethernet tester 324 may operate on electrical signals (such as Ethernet signals) without converting such signals to and from optical signals since the Ethernet tester 324 may operate via electrical cable 107 connected to the router 110, for example.

Wireless Testing (Premises Network)

Referring to FIG. 4B, the WiFi tester 326 may perform one or more WiFi tests 16 using the WiFi interface 26 to test data communication (receive and/or transmit) via a wireless transceiver 408 through a wireless link 109. For example, the wireless transceiver may convert Tx electrical signals 201 from the WiFi tester 326 to outgoing wireless signals and convert incoming wireless signals into Rx electrical signals for the Ethernet tester 324. The WiFi 16 may include a physical layer test, a link layer test, a network layer test, and a service layer test. The WiFi tests 16 may be based on signals transmitted and/or received by the WiFi tester 326.

The WiFi tester 326 may test the physical layer of data communication through the wireless link 109 by measuring a wireless signal strength of the wireless link 109. The measurement may performed for each of various frequencies, such as 2.4 Ghz and 5.0 Ghz frequencies.

The WiFi tester 326 may test the link layer of data communication through the wireless link 109 by determining whether the apparatus is connected to the proper wireless network (such as the correct router by verifying the BSSID of the router 110 to which the WiFi tester 326 is connected is the correct BSSID), verifying that the proper settings are used (such as the correct security profile/type, password, correct band, etc.), and/or verifying other wireless settings.

The WiFi tester 326 may test the network layer of data communication through the wireless link 109 by verifying that the apparatus 100 is able to obtain an IP address and authenticated access to the Internet via the wireless link 109 (from the router 110 and/or or a repeater 112).

The WiFi tester 326 may test the service layer of data communication through the wireless link 109 by transmitting or receiving electrical signals similar to the manner in which the fiber optic tester 322 tests the service layer, except that the WiFi tester 326 may operate on wireless signals without converting such signals to and from optical signals since the wireless tester 324 may operate via wireless link 109 through the router 110 and/or a repeater 112, for example.

It should be noted for the foregoing tests that require verification, the apparatus 100 may access the correct settings (such as the correct PON identification, correct BSSID, etc.) be facilitated by accessing the correct settings that should be used and comparing such settings to those observed by the apparatus 100 during testing.

Application Service Emulation Testing

Any of the foregoing layers and links may be tested further based on emulated application layer data. For example, the application emulator 320 may emulate various types of data or voice services by transmitting and receiving data configured as video, voice, and other types of data for services that may be used at the network and service environment 10. In one example, the application emulator 320 may simulate voice over IP services, streaming video services, standard voice services, and/or other data or voice services by transmitting and receiving emulation data that simulates these services. The emulation data may be pre-stored in the emulation data repository 314 or may be configurable such as by downloading the emulation data, such as from the cloud platform 130 and/or testing apparatus 120. In these examples, the emulation data from the application emulator 320 may be provided to the fiber optic tester 322, the Ethernet tester 324, and/or the WiFi tester 326 to test the emulated services over different physical layers and/or communication links. In some examples, the application emulator 320 may transmit the emulation data via one or more application layer protocols such as SNMP, HTTP, FTP, and/or others. For example, the application emulator 320 may perform emulated testing of web servers or other network services by testing web server response times, latency, and/or other performance characteristic of a web server.

Manual Test Selection and Execution

In some examples, the various optical tests 12, Ethernet tests 14, and WiFi tests 16 (including any of each of their sub-tests for the physical, link, network, and service layers) may be selected and executed based on input from a technician. For example, in operation, the technician may connect the fiber optic interface 22 of the apparatus 100 to the drop terminal 102 or the OTP 104 via a fiber optic cable 105. The technician may press the input member 202 to cycle through the various testing options. It should be noted that other input members (not shown) may be provided to perform such scrolling operation as well. As the technician scrolls through the test options an appropriate UI indicator 20 may indicate that the test is ready to be executed. For example, the Service indicator (UI indicator 20a) may indicate that a service layer test is ready, the Network indicator (UI indicator 20b) may indicate that a network layer test is ready, the Link indicator (UI indicator 20c) may indicate that a link layer test is ready, and the Physical indicator (UI indicator 20d) may indicate that a physical layer test is ready.

In some instances, the OPT active indicator (UI indicator 20h) may indicate that the optical tests 12 are ready when the apparatus 100 is connected to an fiber optic cable 105 through the fiber optic interface 22, the ETH indicator (UI indicator 20i) may indicate that the Ethernet tests 14 are ready when the apparatus 100 is connected to an electrical cable 107 through the Ethernet interface 24, and the WiFi Active indicator (UI indicator 20j) may indicate that the WiFi tests 16 are ready when the apparatus 100 is connected to a wireless link 109 through the WiFi interface 26. Alternatively, the optical tests 12, Ethernet tests 14, and/or WiFi tests 16 may be scrolled in a manner similar to scrolling the different layer tests to select an appropriate test for execution.

To select a test after scrolling, the technician may hard press (press the input member 202) for a predefined period of time or otherwise press another input member.

In this manner, and because the apparatus 100 may be portable, a technician may carry the apparatus 100 throughout and outside the customer premises 11 to test various links (including optical and electrical) and devices.

Workflow-Based Test Selection and Execution

In some examples, the apparatus 100 may be pre-loaded with one or more workflow profiles. A workflow profile may include a plurality of workflow parameters that specify a test to be executed and/or data used for the test. For example, a workflow parameter may include a virtual logical area network setting, a test indicator that identifies a tests is to be performed (such as a ping test, service layer test such as a speed test, a physical layer test, a link layer test, a network layer test), a threshold value for determining whether the service performance test to be performed passes or fails, data for executing the test such as a WiFi credential, and/or other data. The apparatus 100 may use a workflow profile to identify and execute the tests. For example, each test may be coded with an identification the controller 310 (such as via the workflow engine 330) uses to identify the test. Such identification may be indicated in the workflow profile. In some instances, once a workflow profile is selected, the apparatus 100 may automatically initiate the tests specified by the workflow parameters. The tests may include the optical tests 12, the Ethernet tests 14, and/or the WiFi tests 16 (including any of each of their sub-tests for the physical, link, network, and service layers). When more than one test is to be executed, the workflow profile may specify an order in which to execute the tests.

The apparatus 100 may receive a workflow profile from a remote device (a device that is separate from and independently operable of the apparatus 100). For example, the apparatus 100 may receive the workflow profile from a remote device 120 (such as remote apparatus 120, cloud platform 130) via any one of the various interfaces 22, 24, 26, 28 via WiFi interface 26, and/or other device. For example, a user may select or design a workflow profile for uploading to the apparatus 100. Such selection or design may be customized for a particular customer project to resolve an issue or install new service at premises 11. As such, a workflow profile may be a general workflow profile or may be customized for a particular set of tests, such as a specific set of tests for a given premises 11 to service a particular customer project associated with the customer premises 11. Once a workflow profile is received, the apparatus 100 may store the workflow profile in the workflow repository 316.

When onsite at or near the customer premises 11, a technician may select a workflow profile, which may cause the apparatus 100 to automatically execute the workflow profile (in other words, run the one or more tests identified in the workflow profile). In some examples, the workflow profile may include predefined configurations (such as appropriate OLT identification and/or other configuration information, examples of which are illustrated in Table 1). In these examples, some or all of the predefined configurations may be displayed in the test results. In some examples, the predefined configurations may be downloaded to the apparatus 100. In some examples, the apparatus may detect and upload the configurations of the various devices and connections of the premises 11.

In some examples, the apparatus 100 may include a one-touch workflow profile execution. In these examples, the apparatus 100 may receive a press of the input member 202 and execute the tests of the workflow profile. These examples may be beneficial when a single workflow profile is used and facilitates ease of operation. In other examples, the apparatus 100 may permit scrolling through and selecting a plurality of workflow profiles, similar to the manner in which individual tests are scrolled.

During execution of a workflow profile, the apparatus 100 may provide indications of a next test to be executed. For example, the apparatus 100 may activate one or more appropriate UI indicators 20. To illustrate, if an Ethernet test 14 is to be performed, the ETH active (UI indicator 20i) may be activated to indicate that the Ethernet test 14 should be tested next. This prompts the technician to connect the apparatus to the router 110 or other device through which the Ethernet test 14 may be executed. In some examples, the apparatus 100 may provide indications of testing status. For instance, the apparatus 100 may activate one or more UI indicators 20 to indicate the current test being executed. It should be understood that the UI indicators 20 may be activated differently depending on context. For example, a flashing indication may signal the technician to proceed to a next test, while a yellow indication may signal that a test is currently in progress. Other types of indications may be used as well depending on the context/state of the apparatus 100.

Block diagram 300 is a simplified block diagram showing only the blocks relevant for the methods of the present disclosure. Blocks elements not relevant for the methods of this disclosure are not shown, including but not limited to functional elements such as equalizers, lasers, photo receivers, wavelength multiplexers, etc.

Figure 5:
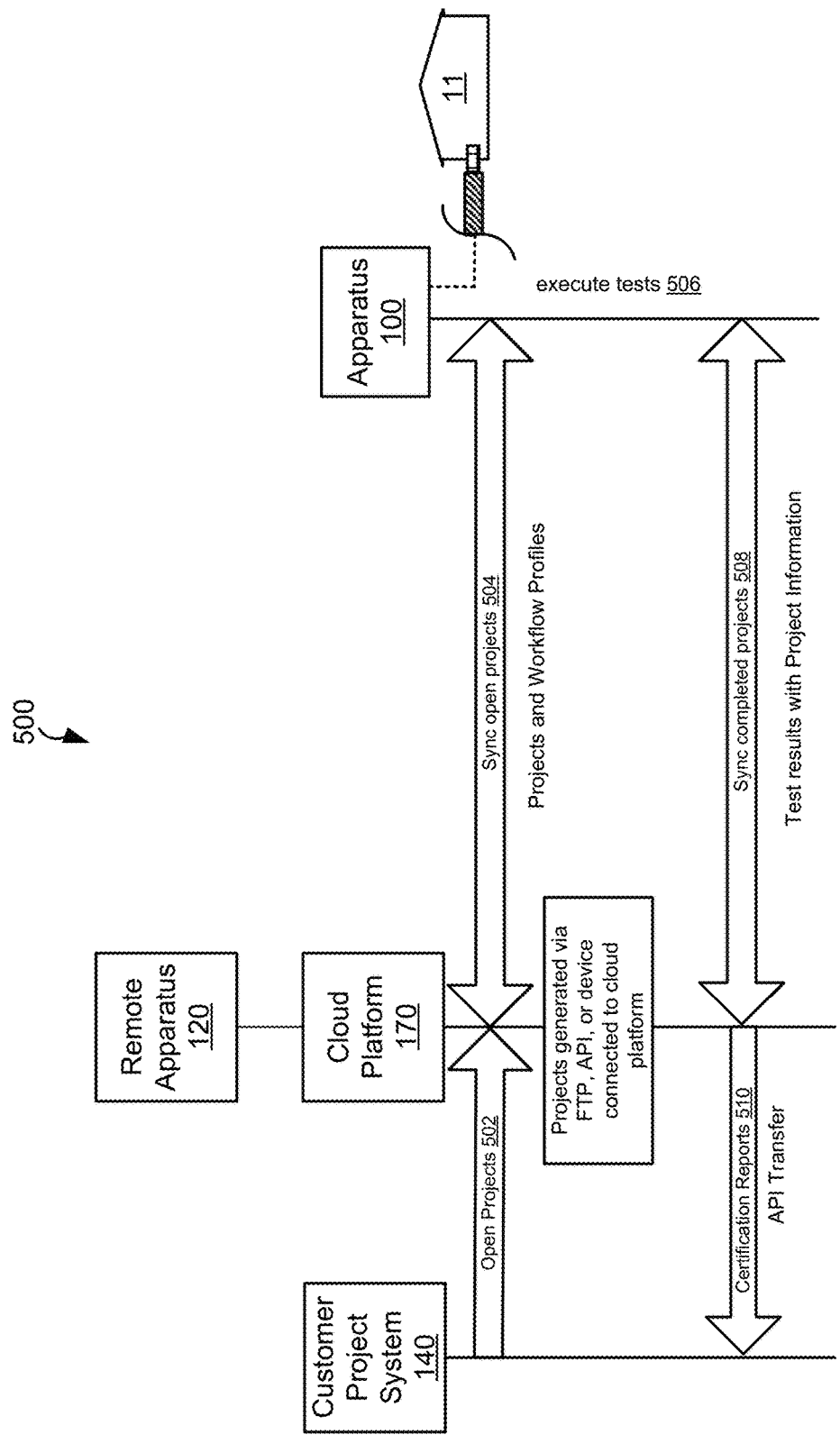
FIG. 5 is a schematic diagram of workflow integration with an apparatus for testing network services in the network and service environment, according to an example of the disclosure.

FIG. 5 is a schematic diagram 500 of workflow integration with an apparatus for testing network services in the network and service environment, according to an example of the disclosure.

At 502, a project may be opened. The project may originate from the customer project system 140 to install service a new customer (such as a new install) or service an existing customer (such as to troubleshoot a problem) at premises 11. In some examples, a workflow profile may be generated or otherwise identified to address the project. For example, a user may use the remote apparatus 120 to specify a set of tests to confirm that new service is working as expected or may include a set of tests to be able to troubleshoot a problem. In either instance, the remote apparatus 120 may generate a workflow profile based on the set of tests, which may include one or more optical tests 12, one or more Ethernet tests 14, and/or one or more WiFi tests 16 be conducted. The workflow profile may be custom-generated for the specific problem, based on a preconfigured template, or be a standard workflow profile that is predefined. The remote apparatus 120 may share the project and/or the workflow profile via the cloud platform 170.

At 504, the cloud platform 170 may provide the project and/or the workflow profile to the apparatus 100. As such, the apparatus 100 may be pre-loaded with the project and/or the workflow profile. At 506, the apparatus 100 may execute the tests from the workflow profile. For example, a technician may use the apparatus 100 to execute the workflow profile as described herein.

At 508, the apparatus 100 may synchronize completed projects with the cloud platform 170. For example, the apparatus 100 may upload the results of testing for each project to the cloud platform 170. At 510, the cloud platform 170 may provide certification reports (such as test results and problem resolution) to the customer project system 140. In this manner, an end-to-end problem to test design and resolution may be facilitated. In some examples, the cloud platform 170 may provide the test results to remote apparatus 120. In some examples, as previously noted, the apparatus 100 may share the test results directly with the remote apparatus 120.

FIG. 6A illustrates a screenshot view of a graphical user interface (GUI) 600A that displays optical signal test results, according to an example of the disclosure. FIG. 6B illustrates a screenshot view of a GUI 600B that displays electrical signal test results, according to an example of the disclosure. FIG. 6C illustrates a screenshot view of a GUI 600C that displays wireless signal test results, according to an example of the disclosure. The GUIS 600A-C may each be provided through a remote device that is separate from the apparatus 100. In some examples, the apparatus 100 transmits the test results to the remote device in raw data, in which case the remote device may format the GUIs 600A-C based on the raw data according to a format usable by the remote device. In other examples, the apparatus 100 may transmit the test results in already formatted form (such as via Hypertext Markup Language (HTML)), in which case the remote device simply displays the formatted form. In some examples, the GUIs 600A-C may each display test results, configurations, and/or other information of some or all layers (e.g., physical layer, service layer, application layer, etc.). In some examples, the GUIs 600A-C may each provide pertinent information relating to each layer, where each layer may be expanded to provide additional details relating to the layer. In this manner, the GUIs 600A-C may each provide expandable, detail drill-down, displays for information relating to each layer.

The remote device may include the remote apparatus 120, the cloud platform 130, and/or other devices. The cloud platform 130 may provide the test results to the remote apparatus 120 and/or other devices.

FIG. 7 illustrates a method 700 of segmenting service performance issues based on tests specified in workflow profiles, according to an example.

At 702, the apparatus 100 may determine that the first input member has been actuated. For example, a technician may have pressed a play button, such as the input member 202 illustrated in FIG. 2A.

At 704, the apparatus 100 may identify a workflow profile based on the actuation of the first input member. For example, the workflow profile may have been previously assigned to an actuation of the play button (such as input member 202) such that pressing the play button may initiate execution of the workflow profile. In some instances, such initiation may be based on a one-touch operation such that a single press of the first input member initiates execution of the workflow profile. In some instances, such initiation may be based on a combination a user inputs such as a long press (press-and-hold for predetermined period of time) the first input member followed by an actuation of a second input member initiates execution of a second workflow profile. Thus, different workflows may be initiated based on single presses and/or combination of presses of different input members.

At 706, the apparatus 100 may access the workflow profile from the data storage, such as the data storage 312. In a specific example, the workflow profile may be accessed from a workflow repository 316. The apparatus 100 may have previously received and stored the workflow profile for automated test execution.

At 708, the apparatus 100 may determine that the speed test is to be executed based on the workflow profile. The workflow profile may include a workflow parameter that specifies the speed test is to be executed. The workflow profile may include further parameters used to execute the speed test, such as a network address of a test server with which the apparatus 100 communicates to execute the specified speed test.

At 710, the apparatus 100 may execute the speed test over the fiber optic interface to generate a first speed test result, execute the speed test over the Ethernet interface to generate a second speed test result, and execute the speed test over the WiFi interface to generate a third speed test result to segment service performance issues to the fiber optic cable, the electrical cable, or the wireless signals. The foregoing tests may be specified by the speed test so that a service performance issue may be segmented (by being localized to either a fiber optic connection, an Ethernet connection, and/or a WiFi connection). It should be appreciated that the apparatus 100 may localize service performance issues based on the device (such as the drop terminal 102, OTP 104, ONT 108, Router 110, or repeaters 112) with which the apparatus 100 interfaces to execute the tests.

In some examples, to execute the speed test via the fiber optic interface, the apparatus 100 may provide a transmit (Tx) electrical signal to the fiber optic interface. The fiber optic interface may convert the Tx electrical signal into a Tx optical signal and transmit the Tx optical signal via a fiber optic cable to the test server, such as the test server 315.

The apparatus 100 may receive an indication of the upload speed based on the transmitted Tx optical signal. The apparatus 100 may receive the Rx electrical signal from the fiber optic interface, and determine a download speed through the fiber optic cable based on the Rx electrical signal. The apparatus 100 may generate the first speed test result based on the upload speed and the download speed.

At 712, the apparatus 100 may transmit the first speed test result, the second speed test result, and the third speed test result to a remote device. The remote device may include the remote apparatus 120 and/or the cloud platform 170.

Figure 8:
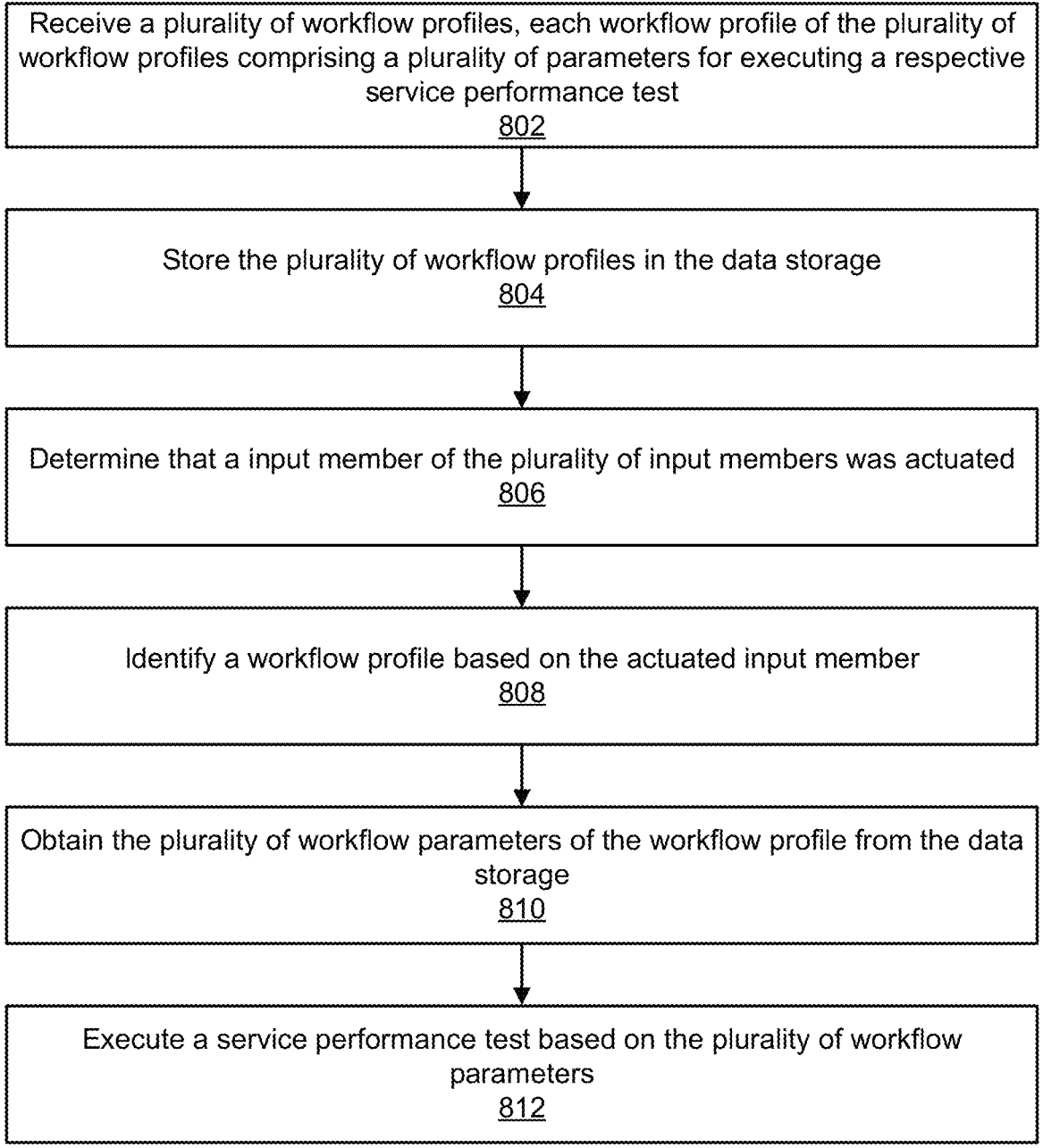
FIG. 8 illustrates a method of integrating workflow profiles with UI actuations to trigger service performance tests of an optical network, according to an example.

FIG. 8 illustrates a method 800 of integrating workflow profiles with UI actuations to trigger service performance tests of an optical network, according to an example.

At 802, the apparatus 100 may receive a plurality of workflow profiles, each workflow profile of the plurality of workflow profiles comprising a plurality of parameters for executing a respective service performance test. The apparatus 100 may receive the workflow profile from cloud platform 170, via a network interface connected to a network 103, or from a remote apparatus 120 via a device interface connected to the apparatus. The network 103 may include the GPON (in which case the apparatus 100 may use the services provided to premises 11) or may include a separate standalone network through which the apparatus 100 may connect to remote devices.

At 804, the apparatus 100 may store the plurality of workflow profiles in a data storage.

At 806, the apparatus 100 may determine that an input member of the plurality of input members was actuated. In some examples, each of the plurality of workflow profiles may be assigned to a respective input member of the plurality of input members, and wherein to identify the workflow profile. The apparatus 100 may determine that the input member has been assigned to the identified workflow profile.

At 808, the apparatus 100 may identify a workflow profile based on the actuated input member. For example, the workflow profile may be assigned to the actuated input member such that actuation of the input member indicates that the workflow profile is to be executed. Alternatively, the workflow profile may be scrolled from among a plurality of workflow profiles and actuation of the input member may indicate that the workflow profile (which was scrolled among the plurality of workflow profiles) is to be executed.

At 810, the apparatus 100 may obtain the plurality of workflow parameters of the workflow profile from the data storage.

At 812, the apparatus 100 may execute a service performance test based on the plurality of workflow parameters. In some examples, the apparatus 100 may obtain a result of the executed service performance test and transmit the result to the cloud platform 170 via the network interface or the remote apparatus 120 via the device interface.

In some examples, the identified workflow profile may be automatically executed based on a one-touch actuation of the input member. In these examples, the apparatus 100 may initiate execution of the workflow profile assigned to the input member when the input member is actuated a single time, enabling single-press execution of the workflow profile. Execution of the workflow profile may include identifying the associated workflow parameters and conducting one or more tests based on the associated workflow parameters.

Figure 9:
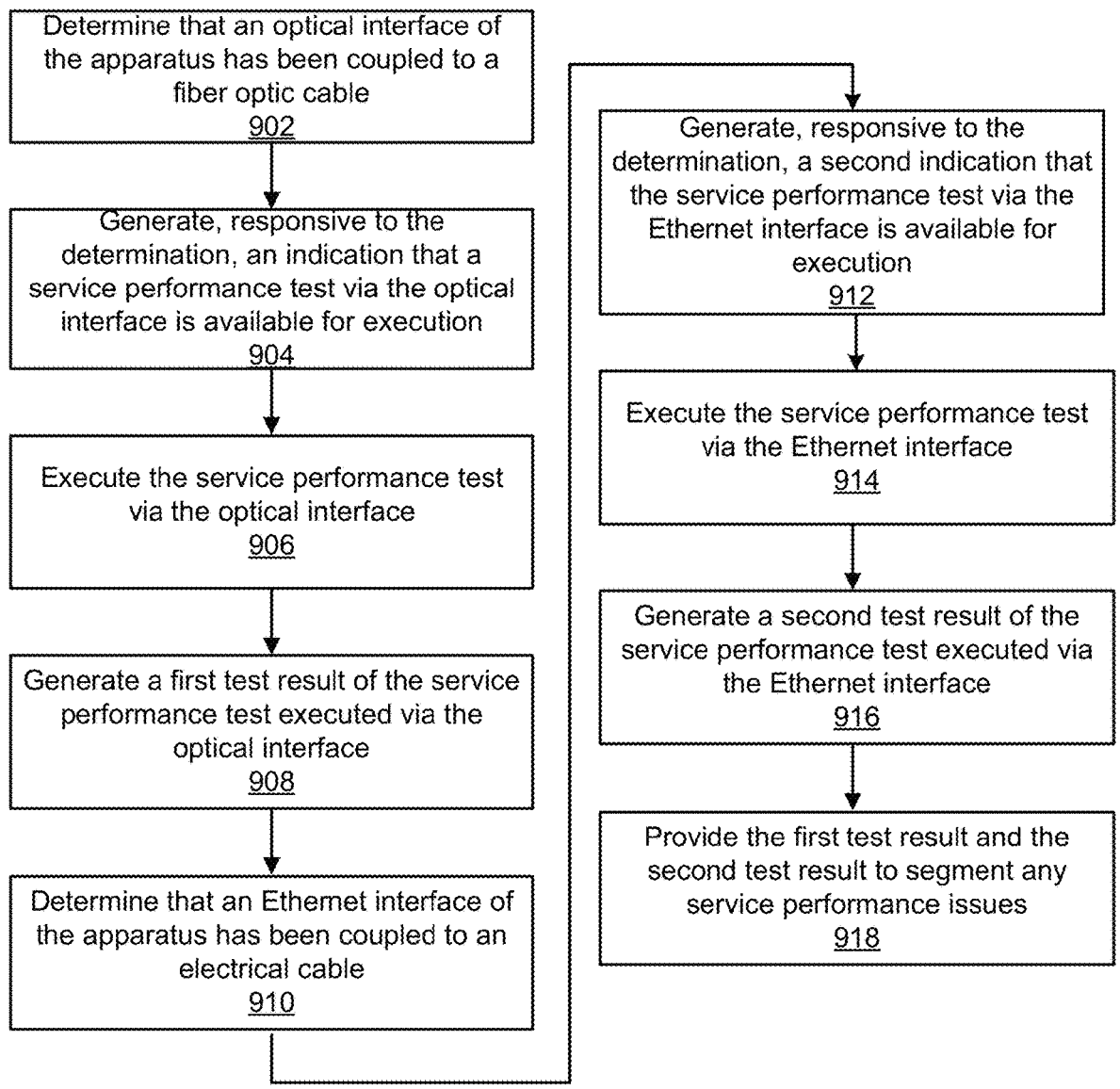
FIG. 9 illustrates a method of segmenting service performance issues, according to an example.

FIG. 9 illustrates a method 900 of segmenting service performance issues, according to an example. At 902, the apparatus 100 may determine that a fiber optic interface 22 of the apparatus has been coupled to a fiber optic cable 105. At 904, the apparatus 100 may generate, responsive to the determination, an indication that a service performance test via the fiber optic interface 22 is available for execution. At 906, the apparatus 100 may execute the service performance test via the fiber optic interface 22. At 908, the apparatus 100 may generate a first test result of the service performance test executed via the fiber optic interface 22. At 910, the apparatus 100 may determine that an Ethernet interface 24 of the apparatus has been coupled to an electrical cable. At 912, the apparatus 100 may generate, responsive to the determination, a second indication that the service performance test via the Ethernet interface 24 is available for execution.

At 914, the apparatus 100 may execute the service performance test via the Ethernet interface 24. At 916, the apparatus 100 may generate a second test result of the service performance test executed via the Ethernet interface 24. At 918, the apparatus 100 may provide the first test result and the second test result to segment any service performance issues. It should be noted that the apparatus 100 may also perform the service performance test via WiFi when the apparatus 100 is coupled to a wireless link 109.

Figure 10:
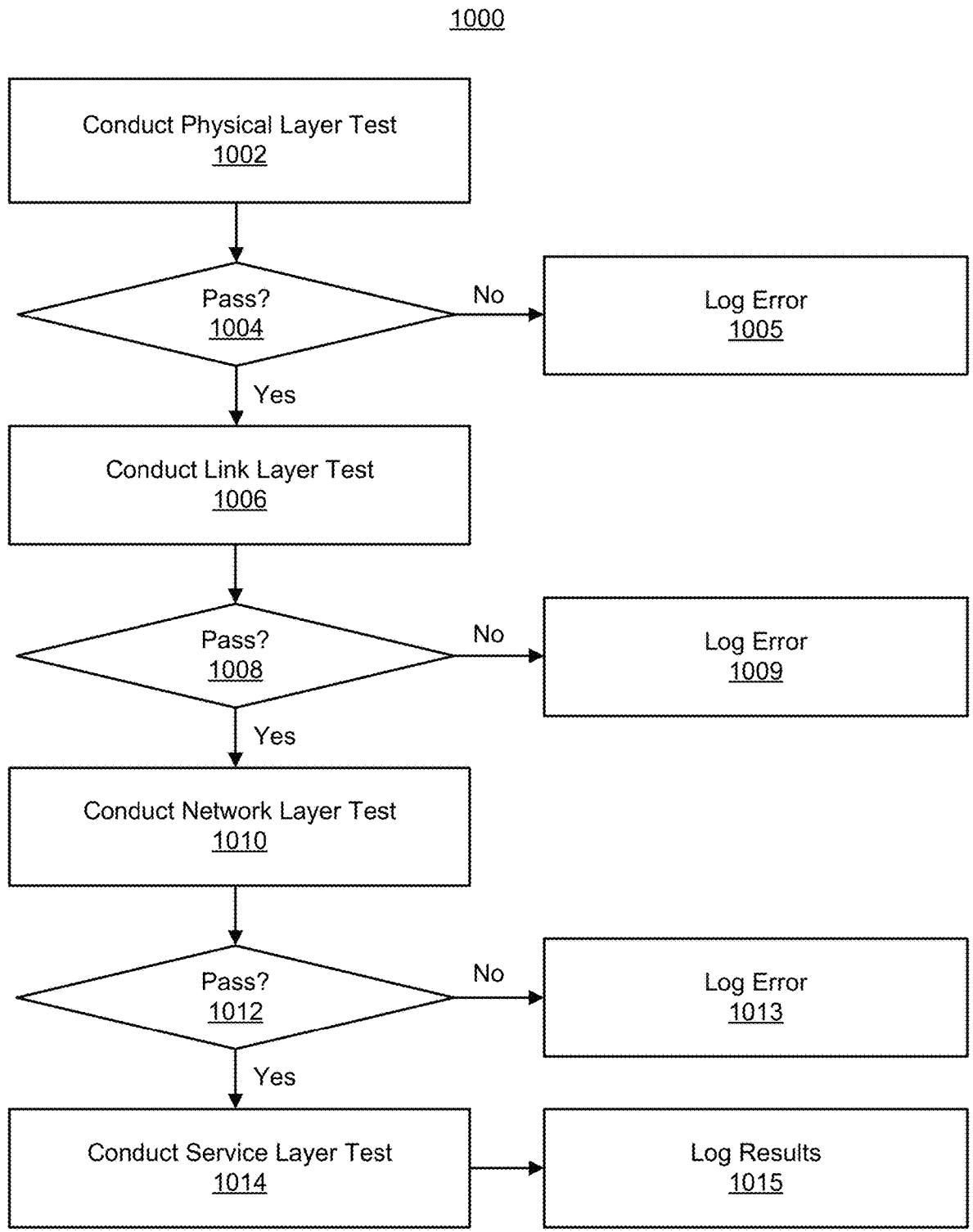
FIG. 10 illustrates a method of a workflow for testing various layers in a communication link, according to an example.

FIG. 10 illustrates a method 1000 of a workflow for testing various layers in a communication link, according to an example. The method 1000 may be used to test various layers for a given link type, such as an optical link, an Ethernet link and a wireless link. At 1002, the apparatus 100 may conduct a physical layer test. For example, for an optical link, the apparatus 100 may measure optical power levels; for an Ethernet link, the apparatus 100 may measure the Ethernet signal; for a WiFi signal, the apparatus 100 may measure the WiFi signal strength. At 1004, the apparatus 100 may determine whether the physical layer test passed. The determination may be based on a predefined threshold value for the link type. If not, at 1005, the apparatus 100 may log errors that indicate why the physical layer test did not pass.

If the physical layer test passed, indicating that any problem is not with the physical layer for this link type, at 1006, the apparatus may conduct a link layer test. For example, for an optical link, the apparatus 100 may determine whether the appropriate OLT is connected to, whether an OLT is configured for an ONT and vice versa; for an Ethernet link, the apparatus 100 may measure determine a level of Ethernet traffic; for a WiFi signal, the apparatus 100 may determine whether the correct WiFi settings are being used (e.g., correct BSSID, security type, and band). At 1008, the apparatus 100 may determine whether the link layer test passed. If not, at 1009, the apparatus 100 may log errors that indicate why the link layer test did not pass.

If the link layer test passed, indicating that any problem is not with the link layer for this link type, at 1010, the apparatus may conduct a network layer test. For example, for optical, Ethernet, and WiFi links, the apparatus 100 may determine whether an IP address is being obtained and whether authentication access has been granted. At 1012, the apparatus 100 may determine whether the network layer test passed. If not, at 1013, the apparatus 100 may log errors that indicate why the network layer test did not pass.

If the network layer test passed, indicating that any problem is not with the link layer for this link type, at 1014, the apparatus may conduct a service layer test. For example, for optical, Ethernet, and WiFi links, the apparatus 100 may conduct a speedtest or other throughput test. At 1015, the apparatus 100 may log the results of the service layer test and/or other tests conducted in the method 1000.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The invention claimed is:

1. A test instrument comprising:
 a first input member to receive a user input;
 a fiber optic interface configured to receive a fiber optic cable, the fiber optic interface to obtain, via the fiber optic cable, an optical signal from a test server and convert the optical signal into an electrical signal;
 an Ethernet interface to send and receive electrical signals via an electrical cable to which the test instrument is removably coupled;
 a WiFi interface to send and receive wireless signals via a WiFi signal;
 a data storage to store a workflow profile, the workflow profile specifying a plurality of tests to be executed by the test instrument, the plurality of tests including at least a speed test to be executed; and
 a controller coupled to the first input member and the fiber optic interface, wherein the controller is to:
  determine that the first input member has been actuated;
  identify a workflow profile based on the actuation of the first input member;
  access the workflow profile from the data storage;
  determine that the speed test is to be executed based on the workflow profile;
  execute the speed test over the fiber optic interface to generate a first speed test result, execute the speed test over the Ethernet interface to generate a second speed test result, and execute the speed test over the WiFi interface to generate a third speed test result to segment service performance issues to the fiber optic cable, the electrical cable, or the WiFi signal; and
  transmit the first speed test result, the second speed test result, and the third speed test result to a remote device.

2. The test instrument of claim 1, wherein to execute the speed test over the fiber optic interface, the controller is further to:
 responsive to the determination that the speed test is to be conducted, provide a transmit (Tx) electrical signal to the fiber optic interface, wherein the fiber optic interface is to convert the Tx electrical signal into a Tx optical signal and transmit the Tx optical signal via the fiber optic cable to the test server;
 receive an indication of an upload speed based on the transmitted Tx optical signal;
 receive an Rx electrical signal from the fiber optic interface;
 determine a download speed through the fiber optic cable based on the Rx electrical signal; and
 generate the first speed test result based on the upload speed and the download speed.

3. The test instrument of claim 1, wherein the workflow profile is configured as a one-touch workflow profile execution such that a single manipulation of the first input member triggers automatic execution of the workflow profile.

4. The test instrument of claim 1, wherein the data storage is to store a plurality of workflow profiles, and wherein the controller is further to:
 scroll through the plurality of workflow profiles for user selection based on inputs received via the first input member;
 receive a selection of a second workflow profile of the plurality of workflow profiles; and
 automatically execute the second workflow profile responsive to the selection.

5. The test instrument of claim 1, wherein the optical signal comprises a passive optical network (PON) signal, an Ethernet passive optical network (EPON) signal, or an electrical Ethernet signal.

6. The test instrument of claim 1, wherein the controller is further to:

receive the workflow profile from the remote device, wherein the workflow profile is stored in the data storage upon receipt from the remote device.

7. The test instrument of claim 1, wherein the controller is further to:
measure an optical power level of the optical signal obtained via the fiber optic interface; and
provide the optical power level to the remote device.

8. The test instrument of claim 1, wherein the controller is further to:
access emulation data that emulates an application service; and
transmit the emulation data via the fiber optic interface, the Ethernet interface, or the WiFi interface to simulate operation of the application service.

9. The test instrument of claim 8, wherein the application service comprises a Voice Over Internet Protocol (VOIP) service, a video service, a streaming service, a web service, or an audio service.

10. The test instrument of claim 1, wherein the controller is further to:
execute a physical layer test, a link layer test, and/or a network layer test; and
provide a result of the physical layer test, the link layer test, and/or the network layer test to the remote device.

11. An apparatus, comprising:
a data storage;
a plurality of input members; and
a controller to:
receive a plurality of workflow profiles, each workflow profile of the plurality of workflow profiles comprising a plurality of parameters for executing a respective service performance test, wherein the plurality of parameters include one or more of a virtual logical area network setting, a ping test indicator that indicates a ping test is to be performed, a speed test indicator that indicates a speed test is to be performed, or a threshold value for determining whether the respective service performance test to be performed passes or fails;
store the plurality of workflow profiles in the data storage;
determine that an input member of the plurality of input members was actuated;
identify a workflow profile based on the actuated input member;
obtain the plurality of workflow parameters of the workflow profile from the data storage; and
execute a service performance test based on the plurality of workflow parameters.

12. The apparatus of claim 11, wherein each of the plurality of workflow profiles is assigned to a respective input member of the plurality of input members, and wherein to identify the workflow profile, the controller is to:
determine that the input member has been assigned to the identified workflow profile.

13. The apparatus of claim 12, wherein the identified workflow profile is automatically executed based on a one-touch actuation of the input member.

14. The apparatus of claim 11, wherein the controller is to:
receive the workflow profile from a cloud platform via a network interface connected to a network or from a remote apparatus via a device interface connected to the remote apparatus.

15. The apparatus of claim 14, wherein the controller is to:
obtain a result of the executed service performance test; and
transmit the result to the cloud platform via the network interface or the remote apparatus via the device interface.

16. The apparatus of claim 11, wherein the apparatus further comprises:
a plurality of UI indicators, wherein each of the plurality of workflow profiles is assigned to a respective UI indicator of the plurality of UI indicators, and wherein to identify a workflow profile, the controller is to:
scroll through the plurality of workflow profiles; and
activate the respective UI indicator as a corresponding workflow profile assigned to the UI indicator is scrolled.

17. The apparatus of claim 11, wherein the service performance test comprises a speed test specified by the workflow profile, and wherein the apparatus further comprises:
a fiber optic interface to send and receive optical signals via a fiber optic cable to which the apparatus is removably coupled;
an Ethernet interface to send and receive electrical signals via an electrical cable to which the apparatus is removably coupled;
a WiFi interface to send and receive wireless signals via a WiFi signal; and
wherein the controller is to execute the speed test over the fiber optic interface to generate a first speed test result, execute the speed test over the Ethernet interface to generate a second speed test result, and execute the speed test over the WiFi interface to generate a third speed test result to segment service performance issues to the fiber optic cable, the electrical cable, or the wireless signals.

18. A method, comprising:
determining, by a controller of an apparatus, that a fiber optic interface of the apparatus has been coupled to a fiber optic cable;
generating, by the controller, responsive to the determination, an indication that a service performance test via the fiber optic interface is available for execution;
executing, by the controller, the service performance test via the fiber optic interface;
generating, by the controller, a first test result of the service performance test executed via the fiber optic interface;
determining, by the controller, that an Ethernet interface of the apparatus has been coupled to an electrical cable;
generating, by the controller, responsive to the determination, a second indication that the service performance test via the Ethernet interface is available for execution;
executing, by the controller, the service performance test via the Ethernet interface;
generating, by the controller, a second test result of the service performance test executed via the Ethernet interface; and
providing, by the controller, the first test result and the second test result.

19. The method of claim 18, wherein further comprising:
detecting, by the controller, authorization to connect to an optical line terminal (OLT) coupled to the apparatus via the fiber optic cable;
determining, by the controller, that the OLT is an appropriate OLT to which the apparatus should be connected; and
determining, by the controller, that the OLT and an optical network terminal (ONT) are properly configured.

20. An apparatus, comprising:
a data storage;
a plurality of input members; and
a controller to:
  receive a plurality of workflow profiles, each workflow profile of the plurality of workflow profiles comprising a plurality of parameters for executing a respective service performance test, wherein each of the plurality of workflow profiles is assigned to a respective input member of the plurality of input members;
  store the plurality of workflow profiles in the data storage;
  determine that an input member of the plurality of input members was actuated;
  identify a workflow profile based on the actuated input member, wherein to identify the workflow profile, the controller is to: determine that the input member has been assigned to the identified workflow profile;
  obtain a plurality of workflow parameters of the workflow profile from the data storage; and
  execute a service performance test based on the plurality of workflow parameters.

21. An apparatus, comprising:
a data storage;
a plurality of input members; and
a controller to:
  receive a plurality of workflow profiles, each workflow profile of the plurality of workflow profiles comprising a plurality of parameters for executing a respective service performance test, wherein the plurality of workflow profiles are received from a cloud platform via a network interface connected to a network or from a remote apparatus via a device interface connected to the remote apparatus;
  store the plurality of workflow profiles in the data storage;
  determine that an input member of the plurality of input members was actuated;
  identify a workflow profile based on the actuated input member;
  obtain a plurality of workflow parameters of the workflow profile from the data storage; and
  execute a service performance test based on the plurality of workflow parameters.

22. An apparatus, comprising:
a data storage;
a plurality of input members;
a plurality of UI indicators; and
a controller to:
  receive a plurality of workflow profiles, each workflow profile of the plurality of workflow profiles comprising a plurality of parameters for executing a respective service performance test, wherein each of the plurality of workflow profiles is assigned to a respective UI indicator of the plurality of UI indicators;
  store the plurality of workflow profiles in the data storage;
  scroll through the plurality of workflow profiles; and
  activate the respective UI indicator as a corresponding workflow profile assigned to the UI indicator is scrolled;
  determine that an input member of the plurality of input members was actuated;
  identify a workflow profile based on the actuated input member;
  obtain a plurality of workflow parameters of the workflow profile from the data storage; and
  execute a service performance test based on the plurality of workflow parameters.

* * * * *